United States Patent
Wan et al.

(10) Patent No.: US 6,539,205 B1
(45) Date of Patent: Mar. 25, 2003

(54) TRAFFIC CHANNEL QUALITY ESTIMATION FROM A DIGITAL CONTROL CHANNEL

(75) Inventors: Yongbing Wan, Irvine, CA (US); Jaleh Komaili, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/046,060

(22) Filed: Mar. 23, 1998

(51) Int. Cl.$^7$ .......................... H04B 17/00; H04B 1/60; H04B 17/02; H04J 11/00; G01R 31/08
(52) U.S. Cl. .................. 455/67.1; 455/10; 370/209; 370/216; 370/335; 370/252; 370/342
(58) Field of Search ................. 455/423, 67.1, 455/10; 370/335, 521, 252, 216, 342, 209; 375/200, 336; 955/455

(56) References Cited

U.S. PATENT DOCUMENTS

| | | | |
|---|---|---|---|
| 4,750,169 A | * 6/1988 | Carse et al. ............... 370/521 |
| 5,396,539 A | * 3/1995 | Slekys et al. | |
| 5,404,573 A | 4/1995 | Yabe et al. | |
| 5,701,294 A | * 12/1997 | Ward et al. ................. 370/252 |
| 5,777,990 A | * 7/1998 | Zehavi et al. ............... 370/335 |
| 5,802,039 A | * 9/1998 | Obayashi et al. ........... 370/216 |
| 5,872,775 A | * 2/1999 | Saints et al. ............... 370/342 |
| 5,896,561 A | * 4/1999 | Schrader et al. ........... 455/67.1 |
| 6,005,855 A | * 12/1999 | Zehavi et al. ............... 370/335 |
| 6,047,191 A | * 4/2000 | Desgagne ................... 455/455 |
| 6,157,820 A | * 12/2000 | Sourour et al. ............. 455/10 |
| 6,381,211 B1 | * 4/2002 | Lysejko et al. ............. 370/209 |

FOREIGN PATENT DOCUMENTS

| WO | WO 97/15131 | 4/1997 |
|---|---|---|
| WO | WO 99/49610 | * 9/1999 |

OTHER PUBLICATIONS

International Search Report, Jun. 25, 1999.

* cited by examiner

*Primary Examiner*—William Cumming
(74) *Attorney, Agent, or Firm*—Knobbe, Martens, Olson & Bear, LLP

(57) ABSTRACT

A method and apparatus for effectively monitoring quality of a traffic channel in a communication, and in response, modifying transmission coding or data transmission rates, or both, improves communication quality and increases data transfers rates in digital wireless communication systems. A channel quality estimator determines and evaluates the bit error rate (BER) of a signal on a control channel and estimates the quality of the traffic channel based on the quality of the control channel signal. Accordingly, the processing and control circuitry of either a mobile station or base station adjusts the error correction applied to traffic channel transmissions. The traffic channel data transmission rate may also be modified based on the control channel signal quality.

21 Claims, 8 Drawing Sheets

DATA TRANSMISSION

TRAFFIC CHANNEL QUALITY ESTIMATION FROM A DIGITAL CONTROL CHANNEL

BACKGROUND OF THE INVENTION

1. Field of the Invention

The present invention relates to the field of communications. In particular, the present invention provides an improved apparatus and method for determining channel quality based on evaluation of a control channel.

2. Background of the Invention

Wireless communication systems continue to experience rapid growth to meet the needs of cellular telephone users. The demand for wireless communication has increased the number of users attempting to gain access to the system and has placed higher expectations on the clarity provided by wireless communication systems. For example, users prefer the audio quality of their wireless service to meet that of a wired connection, and expect wireless service to consistently place a call. Furthermore, users expect the number of "dropped" calls to be at a minimum.

The expanding wireless systems places a premium on existing cellular sites, and in particular, the available bandwidth or bit rate capacity of each base station. The limited number of suitable locations at which cellular sites may be placed increases the demands on existing cellular base station capacity thereby placing an even greater premium on the bandwidth or bit rates of existing base stations.

In general, each cellular site operating in current digital wireless communication systems, such as for example, GSM (Global System for Mobile Communications) use at least two channels over which communication between a mobile station and a base station (cellular site) may occur—at least one data or traffic channel and of at least one control channel. The data or traffic channel shoulders the majority of the exchange by carrying the encoded voice or data transmitted between mobile and base stations of the wireless system.

The control channel provides a communication link between the mobile station and the base station for mobile management tasks. Examples of data exchanged over the one or more control channels include mobile station location, in-coming call traffic control, billing information, and security verifications. Similarly, control channels often provide paging or broadcast services. The amount of data exchanged over the control channel is relatively insignificant compared to the amount of data exchanged over the traffic channel. However, the control channel is very robust because of the importance of the control channel. Although not the focus of the present invention, these safeguards may include extensive redundancy in the form of block-coding and convolutional coding. The extensive redundancy associated with the control channel provides robust error detection and correction.

SUMMARY OF THE INVENTION

A mobile station is typically configured with a fixed bandwidth or bit rate. The communication system assigns the total bit rate based on a system standard. This total bit rate does not change regardless of channel quality, and is typically selected for worst case or near-worst-case channel conditions. Accordingly, the maximum number of users per base station is also fixed.

Various methods exist for determining the quality of the traffic channel. The typical methods include traffic channel frame success rate, signal strength, bit error rate on the traffic channel, and the frame ratio. However, the traffic channel provides an unreliable channel quality indicator due to its high incidence of noise. For example, noise or static over the traffic channel almost always exists. Likewise, a plurality of interference generating sources exist, such as a passing truck, an underpass, or other electromagnetic interference which are inherent in wireless communication. The high incidence of interference on the traffic channel coupled with a generally small degree of error correction (redundancy) on the traffic channel hinders its employ as a reliable channel quality indicator.

The inventors recognized the need for a more reliable and accurate method of evaluating the quality of the traffic channel to allow more flexibility in the system, such as enabling modifying the channel coding and/or permitting a higher bit or lower bit rate.

The present invention provides a method and apparatus for use in a digital communication systems, such as GSM, to more accurately evaluate the traffic channel quality, and in response, modify the channel coding used during the transmission of speech data or modify the channel coding and/or the effective bit rate on a traffic channel.

The present invention provides an improved method and apparatus for evaluating the traffic channel quality. An associated control channel is present during an active speech call or active data transmission. Because the control channel is very robust, the control channel quality is very predictive of the actual channel quality of the traffic channel where the traffic channel and the control channel are related, such as by frequency, or otherwise experiencing similar interference and fading. In other words, the efficacy of a channel quality determination based on the control channel is reliable because on the control channel spurious noise is less likely to provide a non-reliable indicator of steady-state changing channel quality. During an active voice or data call, the associated control channel, such as the Slow Associated Control Channel in a GSM communication system, is monitored to obtain an estimation of gross bit error rate (BER). The BER of the control channel is calculated by reencoding the successfully decoded information bits and comparing them to the received bits. In a preferred embodiment, BER rate is only calculated if a PASS result from block decoding. The estimated BER, which may be filtered, is then used to determine the control channel quality. The quality of the control channel can then be applied to the traffic channel and used to select channel coding for the traffic channel which maximizes the efficient use of system bit rates without significantly degrading the speech quality. The determination of the traffic channel quality from the control channel estimated BER can be made by preset thresholds or variable thresholds. Where the control channel and traffic channel are related such that the control channel experiences similar interference to the traffic channel, as in most cases, the control channel signal quality is predictive of the traffic channel quality.

In one embodiment, the invention comprises a method for estimating the quality of a traffic channel in a wireless communication system having at least one control channel and at least one associated traffic channel. In particular, the method involves receiving a coded version of a control channel signal, decoding and re-encoding the control channel signal, and comparing the received coded version of the control channel signal with the decoded (corrected) and re-encoded control channel signal to determine the difference between the two. The difference represents errors in the control channel signal, and is used to calculate the bit error rate. Based on the difference, a similar signal quality is assumed for the traffic channel.

In another embodiment, the channel quality estimator comprises a signal decoder configured to decode an encoded control channel signal and a signal storage device configured to store the received control channel signal while the estimator re-encodes the decoded control channel signal. A comparator coupled to the re-encoder and the signal storage device determines the number of bits which differ between the two. The difference, or bit error rate, enters an evaluation module which estimates the quality of the channel based on the bit error rate.

In yet another embodiment, the invention comprises an error correction controller configured to select the error correction overhead (channel coding) to apply to signals on a traffic channel. The controller comprises a signal decoder configured to decode an encoded control channel signal. A re-encoding module re-encodes the decoded (corrected) signal, and a comparator configured to receive both of the re-encoded signal from the signal decoder and a stored signal from a signal storage device (containing the received signal) compares the two signals. An error correction selector receives information from the comparator and evaluates the control channel signal quality. Based on the control channel signal quality, the selector selects appropriate overhead (error detection and correction coding) to apply to outgoing data transmissions on the traffic channel.

In one embodiment, the frame error rate can be used rather than the bit error rate. As with the bit error rate, preferably, the decoded control channel signal is only re-encoded and the frame error rate calculated if a PASS results from block decoding.

DETAILED DESCRIPTION OF THE PREFERRED EMBODIMENT

As used in this application, "total bit rate" is the bit rate of all bits including redundancy. "Effective bit rate" refers to the bit rate of data bits without encoding redundancy.

Figure 1:
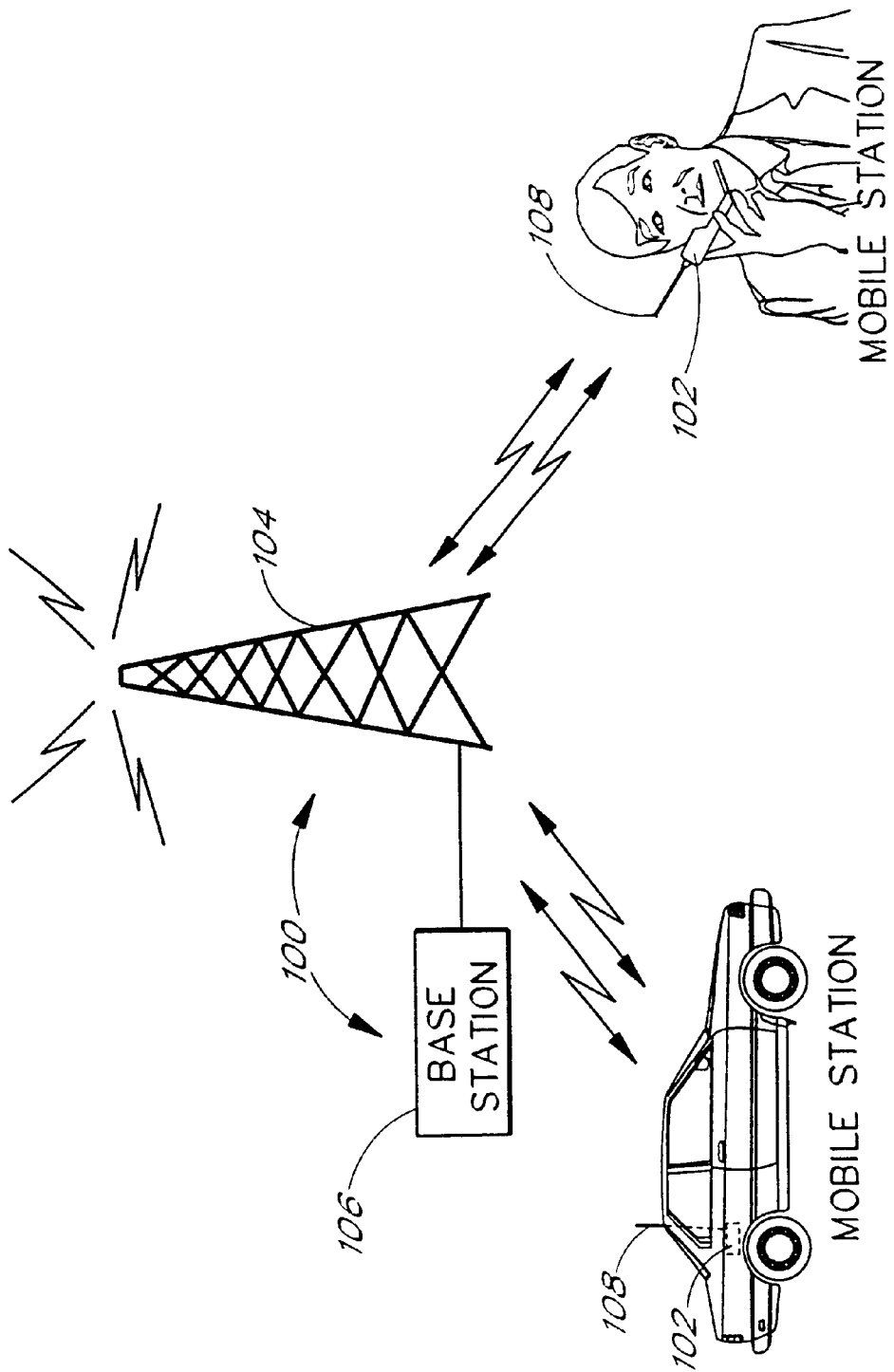
FIG. 1 illustrates basic components of a wireless communication system.

FIG. 1 illustrates the basic components of a wireless communication system, as embodied in a cellular telephone communication network. Modem cellular communication systems generally comprise a plurality of base stations 100 (cellular sites) and mobile stations 102. Each base station 100 generally comprises a base station antenna 104 and base station architecture 106.

Each mobile station 102 generally includes an antenna 108 and is often located in a hand held unit, an automobile or other mobile vessel. The mobile stations 102, movable within the network, operate to transmit data to the base stations 106. The base stations 106 are similarly equipped to transmit data to the mobile station 102.

In many modem digital communication systems, such as GSM, the base station 106 and the mobile station 102 communicate over at least two separate channels, each channel possessing a separate frequency or coding scheme, or occupying a separate time frame on the same frequency with the same or different coding scheme. The first channel, a traffic channel generally carries the majority of the data, either voice or other digital data, which a user desires to transmit. The control channel provides a communication link between the mobile station and the base station for mobile management tasks, such as mobile location, in-coming call traffic control, billing information, security verifications, paging or broadcast services.

Transmission over a wireless network often introduces errors into the digital data stream. To detect and correct these errors, the traffic channel data is typically coded with block and convolutional encoding (generally referred to in this description as error correction overhead and/or redundancy). The encoding (error correction overhead) permits the receiving station to correct some errors in the signal which occur during transmission from station to station. Examples of the type of encoding methods include block coding, convolutional coding and others. Using these types of encoding patterns, the receiving station can more accurately reproduce the original speech or data transmission. However, the error correction overhead on the traffic channel is fixed, and is generally minimal.

The number of errors which are introduced during transmission is often referred to as the bit error rate or BER. The BER is simply a ratio of the number of bits in error to the number of total bits received. A high BER indicates a high rate of error which is generally caused by a poor channel.

In the prior art, the overhead, often referred to as forward error correction encoding algorithm or channel coding, is constant, regardless of the actual need for the particular channel coding. Likewise, if the traffic channel is configured to carry digital data, the data rate is held constant, regardless of the capability of the channel to support an increased data rate. This is a significant drawback because it restricts communication systems from adjusting to changing channel conditions and most efficiently using system bandwidth.

As mentioned previously one or more additional channels, known as control channels, are maintained between the base station 106 and mobile station 102. The control channels have a slow effective bit rate and carry extensive error correction overhead. The control channel carries extensive channel coding because the accurate exchange of information over the control channel is essential for proper system operation. The extensive error correction capability enhances the robust reconstruction of the signal transmitted. Examples of the type of data exchanged over the control channel(s) include, but are not limited to, base station selection, mobile station location, billing information and paging information.

Conventional base stations are limited in the number of mobile stations simultaneously supported because of the constant total bit rate capacity. In addition, in times of poor channel quality, current systems do not provide any flexibility to increase channel coding and reduce the maximum number of users. The present invention provides flexibility and increases the efficient use of available bandwidth. In the present invention, each base station 106 has a maximum bit rate or a maximum number of bits which it may process per second from all mobile stations combined. The base station 106 is not capable of processing a greater number of bits per second than its maximum bit rate. This bit rate is determined by the general configuration of the base station electronics and the network. Accordingly, this maximum bit rate establishes an absolute maximum. Thus, a base station 106 always has a maximum number of mobile stations 102 it can support with no encoding.

Reducing the error correction overhead reduces the total bit rate for one the traffic channel for a particular mobile station having a constant effective bit rate. Therefore, reducing the total bit rate exchanged between each mobile station 102 and base station 106 increases the number of mobile stations which a base station may support. Lowering the amount of error correction overhead reduces the total bit rate of the traffic channel on a per mobile basis (leaving the effective bit rate constant) and consequently allows each base station 106 to support additional mobile stations 102 within its maximum bit rate constraint (total bandwidth). Increasing the number of mobile stations 102 which a base station 106 may service advantageously increases the number of users serviceable on a network and further reduces the need for additional base stations (cellular sites).

However, when the quality of the traffic channel is poor, minimal error correction algorithms or schemes do not provide the receiving station with adequate information to recreate an accurate signal. Thus, calls may be dropped or the receiving station (base or mobile) may inaccurately recreate the transmitted signals. Increasing the error correction overhead provides additional error correction capability, but this undesirably increases the total bit rate for the particular mobile station, and consumes valuable base station bandwidth. In short, under poor channel conditions, increasing error correction capability is desirable, while during periods of robust channel conditions, a high degree of its error correction overhead is undesirable because it wastes base station bandwidth with more redundancy than necessary.

In an effort to increase the number of mobile stations 102 a base station 106 may support, and more reliably transmit data in accordance with changing signal quality, a wireless communication system in accordance with one aspect of the present invention preferably utilizes the control channel to ascertain the quality of the traffic channel and, based on the quality of the control channel, adjusts the amount of error correction overhead (selects different channel coding) included on the traffic channel. Thus, only the degree of error correction necessary for existing channel conditions is used.

The traffic channel, existing simultaneously in time and route with the control channel, experiences interference which closely matches that of the traffic channel. The traffic channel provides, therefore, an accurate inference that the quality of the traffic channel mirrors the quality of the control channel.

Determining the quality of the traffic channel based on the quality of the control channel has many advantages. One advantage over prior systems is that data on the control channel provides a better indication of the true channel quality because the high degree of error correction included on the control channel allows the receiving station to create an exact replication of the transmitted signal, which may be compared to the possibly corrupted signal which was actually received. Thus, a more accurate portrayal of true channel conditions is available using the control channel. Using the traffic channel to monitor signal quality is less desirable because the traffic channel redundancy is much lower and errors are common even with the reasonable channel quality. However, the traffic channel could also be used in monitoring signal quality and adjusting channel coding and/or bit rates.

Control Channel Quality Estimation

Figure 2:
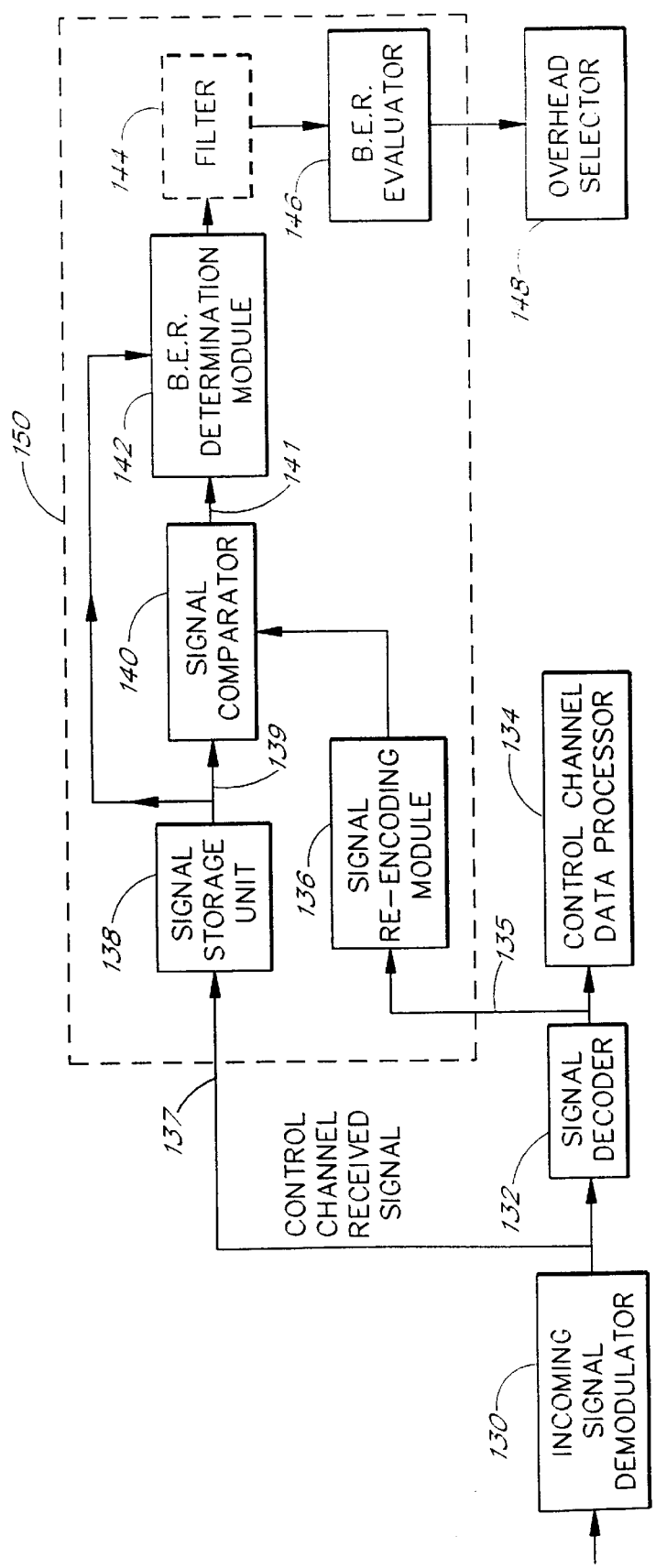
FIG. 2 is a block diagram illustrating a channel quality estimator.

FIG. 2 provides a block diagram which illustrates the channel quality estimation of the present invention. An antenna 108, 104 (FIG. 1) or other reception means obtains an incoming control channel signal which enters a demodulator 130, which demodulates the signal as well known in the art. The resulting signal is reverse coded (e.g., reverse convolutional encoded and reverse block coded) with the signal decoder 132, as well understood in the art. The decoded control channel signal is provided to the conventional control channel processing module 134.

In addition, the signal arriving over the control channel is provided to a channel quality estimator 150 from the demodulator 130 and from the decoder 132. The channel quality estimator 150 evaluates the bit error rate (BER) of the signal arriving over the control channel. The system may infer the quality of the traffic channel based on the output of the channel quality estimator 150 because the control channel and the traffic channel are generally subject to the same distorting effects.

The channel quality estimator 150 has a signal storage unit 138, a signal re-encoding module 136, a signal comparator 140, a bit error rate determination module 142, an optional filter 144 and bit error rate evaluation module 146. An overhead selector 148 receives the output of the estimator 150.

The demodulated control channel signal enters the signal storage unit 138 from an input 137 to the estimator 150. The signal storage unit 138 stores the signal for later analysis. Another input 135 to the estimator 150 provides the decoded control channel signal to the signal re-encoding module 136. As explained above, the decoded signal has undergone reverse encoding techniques (such as reverse convolutional (e.g., Viterbi) and reverse block coding) well understood in the art, so that the decoded signal is an error-free reconstruction of the transmitted data bits. Indeed, for the control channel, the reverse block decoding or cyclical redundancy check (CRC) is very robust, and a very high confidence is required to obtain a PASS for the decoded control channel signal. The re-encoding module 136 re-encodes the decoded signal. Preferably, the re-encoding is only completed if PASS was obtained with the reverse block decoding. The signal is re-encoded so that the received signal and the re-encoded signal may be compared for differences on a bit-by-bit basis.

A signal comparator 140 coupled to both the signal storage unit 138 and the signal re-encoding module 136 compares the received signal with the re-encoded signal on a bit-by-bit basis to determine the number of bits which are different between the two signals. Based on this evaluation, the bit-error-rate determination module 142 calculates at a bit error rate (BER), for the incoming control channel signal. The BER determination module of the current embodiment obtains information about the total number of bits by monitoring the signal storage unit output 139. The BER determination module 142 is also coupled to via a signal line 141 to the signal comparator 140. The BER is the number of incoming bits which are in error or corrupted as compare to the total number of incoming bits. A low BER indicates a high quality channel whereas a high BER indicates poor channel quality.

It should be understood that the BER determination module is an exemplary method of determining the quality of the control channel. The "frame error rate," also well understood in the art, could also be used in place of or in addition to the BER.

In one embodiment, the BER signal enters an optional filter 144 to provide a more useful representation of the actual BER over time and thereby eliminating minute fluctuations of the BER in time. Filtering the BER reveals more consistent trends which thereby provide a more accurate representation of the true quality of the channel through averaging or smoothing. For example, the control channel may degrade for a moment while a large vehicle passes. Decisions, such as switching to a different base station or modifying the redundancy of the traffic channel should not be based on such transient occurrences.

Finally, a BER evaluator 146 analyses the BER. Based on an evaluation of the BER, either of the base station transmitter or mobile station transmitter may adjust the error correction encoding used for the outgoing signal on the traffic channel. The overhead is selected with an overhead selector 148. The overhead selector 148 may be embodied in many ways, such as program executing on the processor for the mobile or base station, or both, or as firmware or as a separate circuit. Typically, the monitoring and/or adjustment would take place at the base station 106 because of the potential for higher processing capabilities at the base station. However, with a bit error rate determination module in the mobile station, such decisions can also be made at the mobile station. The station selecting the encoding transmits the selected encoding process to the receiving station to enable proper decoding.

As discussed previously, adjusting the overhead included on the traffic channel with the voice data affects the total bit rate between mobile station 102 and the base station 106. Reducing the redundancy allows additional mobile stations 102 to gain access to the base station 106. Alterations to redundancy may be to alter block coding (.e.g, parity) redundancy and/or alter the convolutional encoding algorithm or complexity.

Bit Error Rate Evaluator

Figure 3:
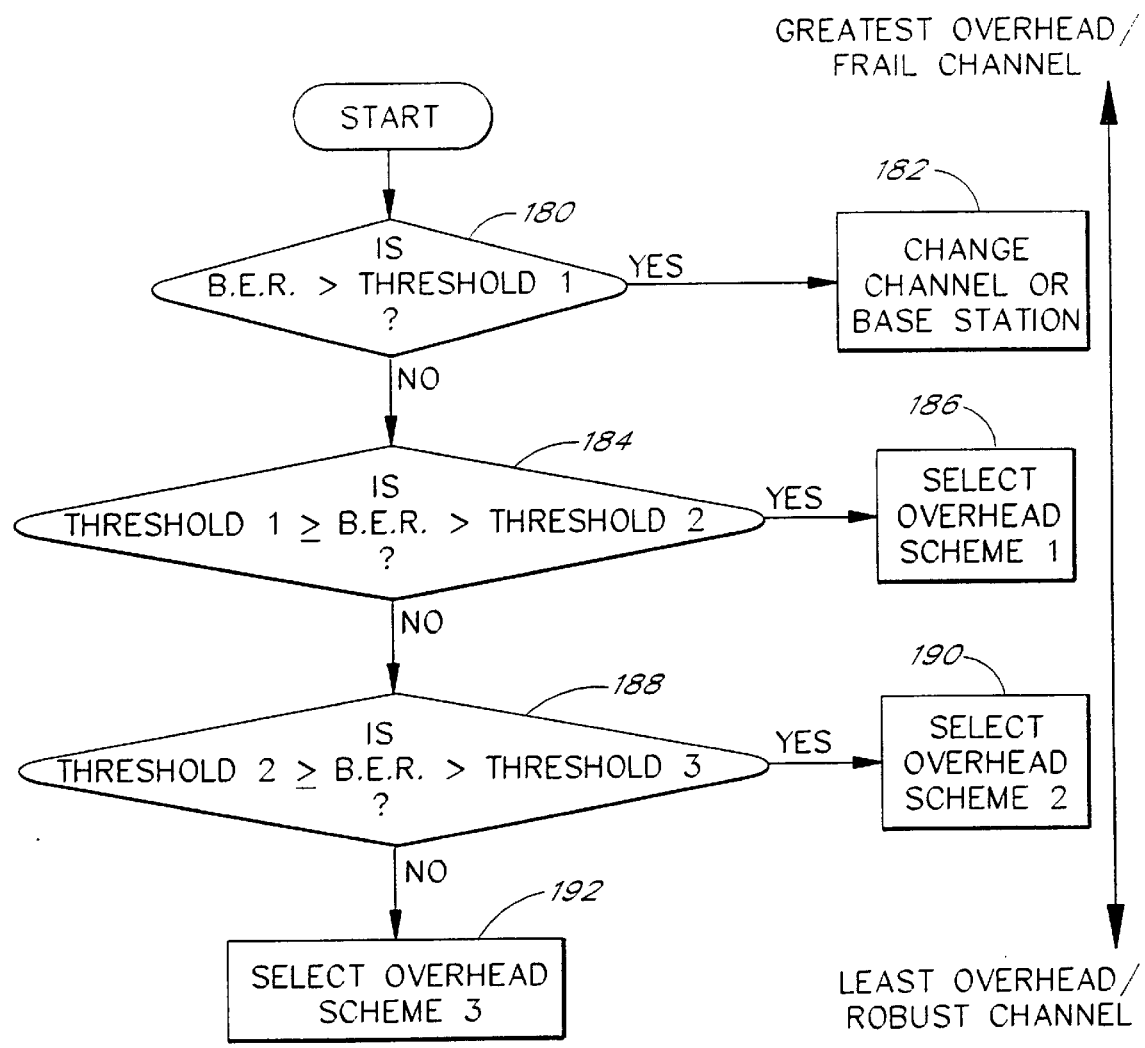
FIG. 3 is a flow chart of a bit error rate evaluator.

FIG. 3 illustrates a flow chart for one example of the operation of the BER evaluator 146 of FIG. 2. A wireless communication system in accordance with the present invention may be capable of using a number of different encoding schemes. These encoding schemes may involve different levels of redundancy for varying channel quality. Accordingly, each scheme would preferably utilize a different amount of overhead. Error correction schemes having a high amount of overhead would provide the greatest amount of error correction capability and are best suited for poor channel conditions. Conversely, error correction schemes having minimal overhead would provide little error correction capability and are best suited for ideal channel conditions. In exceptionally high channel quality (rarely present), encoding may be dropped entirely, or only parity may be calculated.

In the exemplary embodiment described herein, the communication system includes three error correction schemes or algorithms, each being selectively implemented based on an evaluation of the BER of the control channel, and each providing a different degree of error correction overhead with the signal on the traffic channel. Further, the present embodiment also includes three BER thresholds, each BER threshold causing either the system to transfer communication with the mobile station 102 to a new base station 106 or the adoption of a different error correction scheme. In particular, a BER threshold defines a range of BER values which define a set mode of operation. When the BER crosses one of the threshold values, it is at a level which the system should take action based on the quality of the control channel. However, of course, any number of schemes could be implemented, and two or more provide an improvement over existing systems which have no flexibility.

After the channel quality estimator 150 determines the BER, the overhead scheme selector 148 (FIG. 2) selectively adjusts the amount of error correction overhead applied for the data on the traffic channel. In the exemplary embodiment described herein, the BER is tested for plurality of the thresholds. The first threshold (block 180) is set to a BER value representing the lower channel quality limit. If the BER rises above this limit, the number of bits which arrive corrupted is too great to maintain an acceptable traffic channel communication link between the base station 106 and the mobile station 102 over the existing channel with the available encoding schemes. Consequently, if the BER is greater than or equal to the first threshold, the communication network may switch to another physical channel, another frequency, another frame combination (e.g., half rate to full rate channel) or transfers responsibility for communication to a different base station (block 182).

If the BER is less then the first threshold, the BER is compared to a second threshold (block 184). A BER value between the first and second thresholds represents high error rates in the system, which are appropriately afforded the greatest degree of error correction. If the value of the BER is between the first and second threshold, the overhead selector 148 causes the transmitting circuitry in either or both of the base station 106 and the mobile station 102 to assume a first overhead (encoding) scheme (block 186). The first overhead scheme incorporates a high degree of error detection and correction to compensate for the generally high BER.

Increasing the amount of error correction overhead when the BER is high (i.e., when the signal is encountering a large amount of corruption), advantageously ensures that the receiving station obtains adequate encoding permit accurate reconstruction of the transmitted data. Systems of the prior art undesirably hold the encoding scheme constant, even during poor channel conditions and thus pass static, garbled sounds and corrupt data to a user or subject a user to "dropped" calls.

If the BER is less than the second threshold, the BER is compared to a third threshold (block 188). If the BER is less than or equal to the second threshold but greater than the third threshold, a second encoding scheme is selected (block 190). The second encoding scheme incorporates less overhead than the first overhead scheme because the lower BER indicates a better channel quality, requiring less error correction. Most wireless communication systems in operation today fix a level of error correction overhead equivalent to the second error correction scheme. This inflexibility undesirably prevents the wireless network from adjusting the bit rate on the traffic channel to account for the changing channel conditions encountered by each of a plurality of mobile stations. This results in less efficient use of the base station bandwidth.

If the BER does not fall within the limits of the second and third threshold, a third overhead scheme is selected (block 192). When the BER is below the third threshold, the overhead scheme selector selects the third encoding scheme. The third encoding scheme incorporates the least amount of redundancy because the low BER indicates a robust channel which does not introduce corruption on the traffic channel, and hence does not require extensive error correction overhead. Of course, additional levels of encoding complexity could be used, but the more levels that are provided, the more complex the processing required of the systems, which adds cost. Advantageously, reducing the amount of overhead included with the data packets or voice frames transmitted on the traffic channel reduces the total bit rate of each mobile station 102 without decreasing the effective bit rate (i.e., the number of bits to represent (effective bit rate) the voice transmission remains the same while the total bit rate decreases). Maintaining the effective (data) bit rate maintains the requisite amount of information to ensure accurate and clear voice or data reproduction. Each base station 106 in the network is able to support additional mobile stations 102 because each mobile station consumes a smaller portion of a base station's bandwidth.

Figure 4:
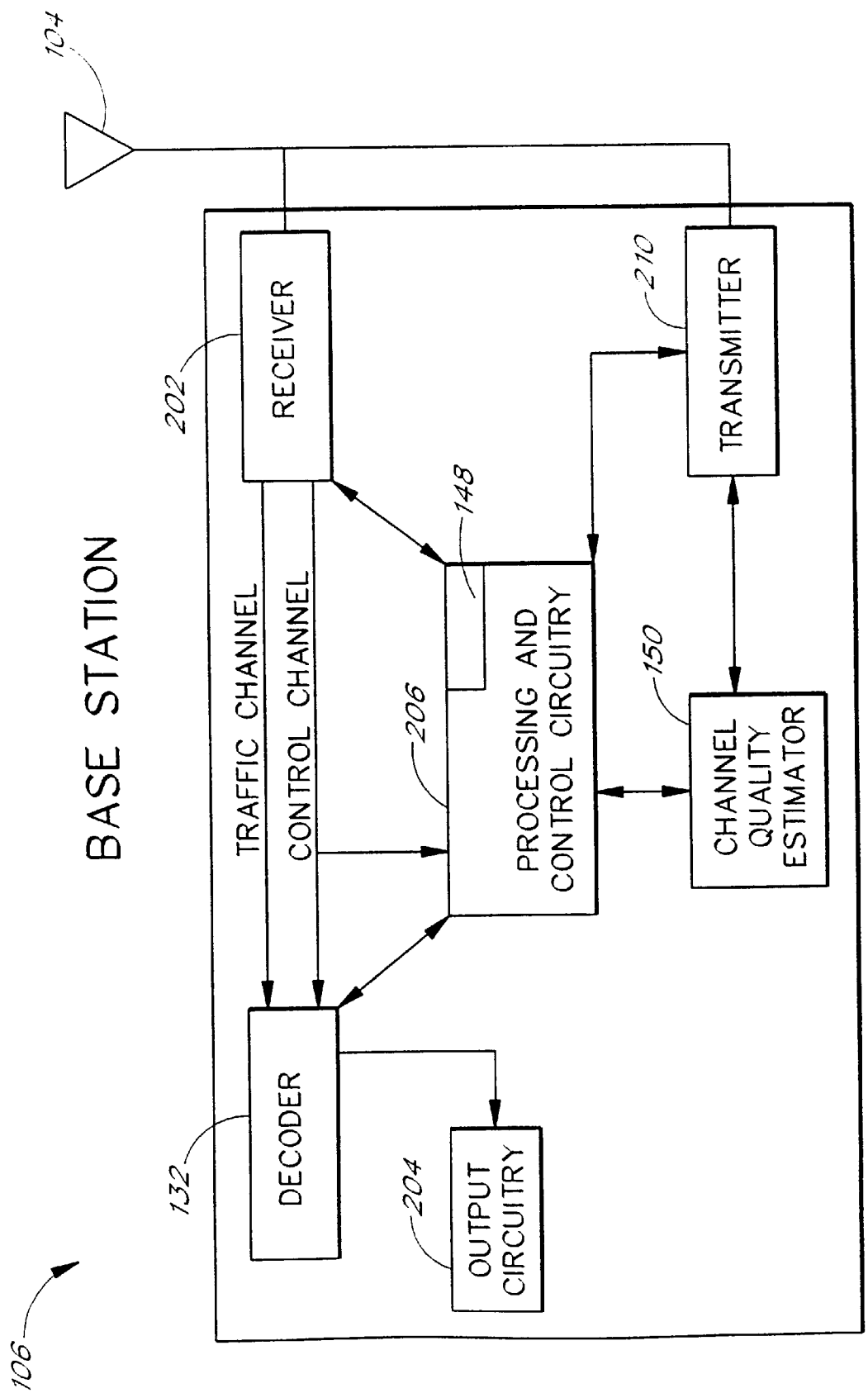
FIG. 4 is a block diagram of a base station having a channel quality estimator in accordance with the present invention.

FIG. 4 illustrates a block diagram of one embodiment of a base station 106 incorporating the above-described channel quality estimator 150 and overhead scheme selector 148 (operating within the processing and control circuits 206). One embodiment of the base station 106 includes an antenna 104 for receiving radio waves and transforming the radio waves into electrical signals. The antenna 104 functions in cooperation with a transmitter 210 and receiver 202. Processing and control circuitry 206 oversees operation of the base station 106 and provides the overhead selector 148. The processing and control circuitry 206 coordinates operation of the receiver 202, a decoder 132, a channel quality estimator 150 and the transmitter 210.

The receiver 202 obtains the incoming signals from the antenna 104 and performs various functions on the incoming signal, including, but not limited to demodulation, channel separation and signal strength adjustment. Preferably, the receiver 202 separates the traffic channel and the control channel, as shown, and routes both to the decoder 132. In addition, the receiver 202 is in communication with the processing control circuit 206 which receives the demodulated control channel signal from the receiver 202.

The decoder 132 performs reverse encoding operations, and applies various error correction algorithms to the incoming signals. An output of the decoder 132 forwards the traffic channel information to the output circuitry 204. The decoder 132 also provides the decoded control channel signal to the processing and control circuitry 206 for communication link management in a conventional manner. The control circuitry also provides the control channel (prior to and subsequent to decoding) to the channel quality estimator 150. Alternatively, the control channel signal can be provided directly from the receiver 202 to the channel quality estimator 150, and directly from the decoder 132 to the estimator 150. The channel quality estimator 150 evaluates the quality of the control channel in the manner described above with reference to FIGS. 2 and 3. The quality of traffic channel is generally similar to the quality of the control channel. The channel quality estimator 150 reports the BER to the processing and control circuitry which in conjunction alters the error correction scheme (encoding) for the outgoing data on the traffic channel. The transmitter 210 performs the selected encoding (error overhead) and modulation and transfers the data to the antenna 104 for transmission.

Other arrangements, either in hardware and/or software are available as a substitute to the above described configuration which do not depart from the scope of the present invention.

Figure 5:
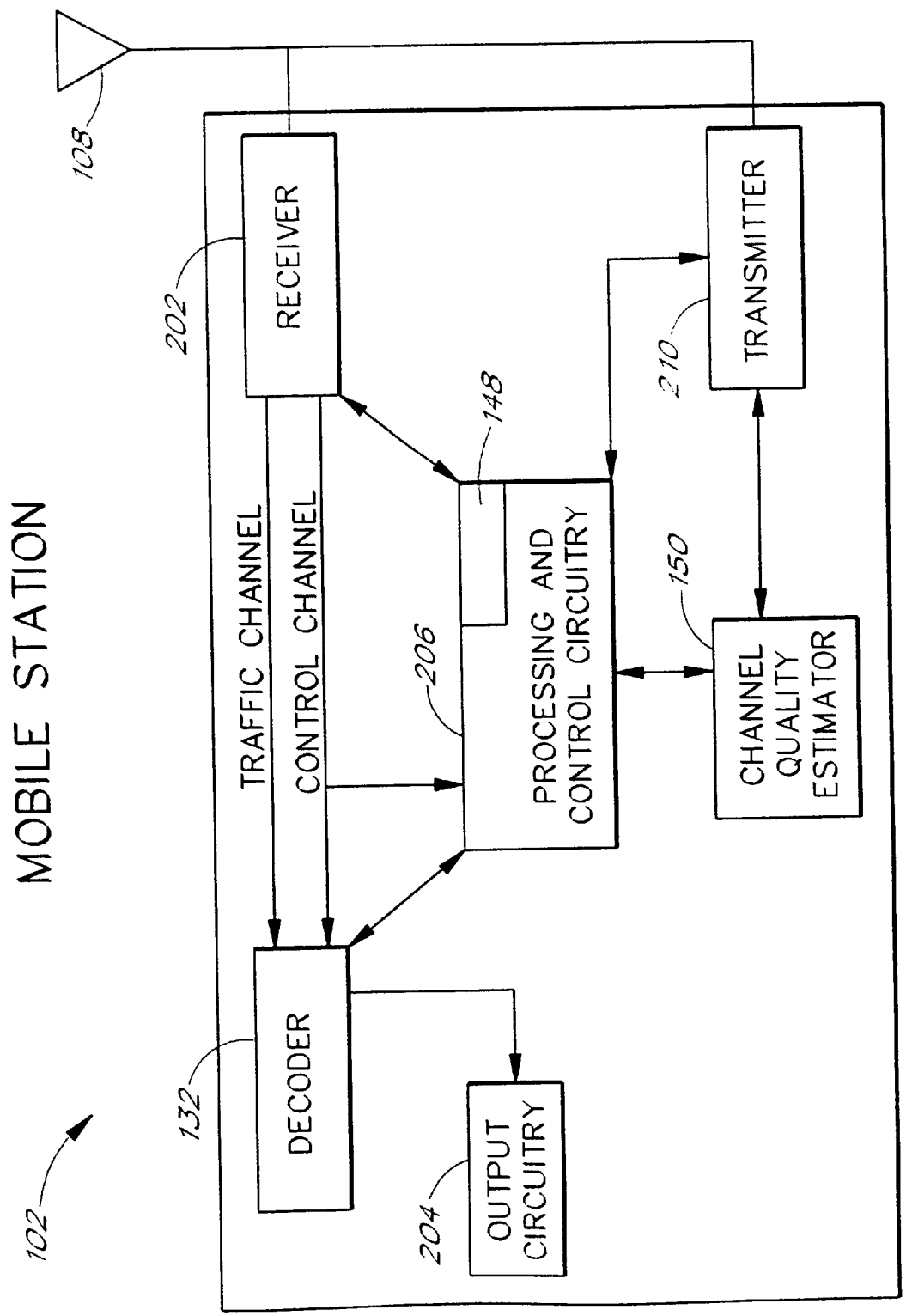
FIG. 5 is a block diagram of a mobile station having a channel quality estimator in accordance with the present invention.

FIG. 5 illustrates a block diagram of one embodiment of a mobile station 102 incorporating the above described channel quality estimator and overhead scheme selector 148. As shown, the components and operation of the mobile station 102 are generally similar to the components and operation of the base station 106. Accordingly, a detailed description of the components and operation of the mobile station 102 is not repeated. However, if the data on the traffic channel is voice information, the output circuitry 204 includes means to convert the digital data to an analog signal and amplification means to provide an audible signal to a speaker (not shown). Because the quality of the channel from the mobile station 102 to the base station 106 often differs from the channel quality from the base station to the mobile station, both the mobile station and the base station may incorporate the channel quality estimator 150 and overhead scheme selector 148 in a preferred embodiment. Incorporating the channel quality estimator and overhead selector on both the mobile station 102 and base station 102 advantageously provides means on each station to accurately evaluate the channel quality and adjust the amount of associated error correction overhead. In another embodiment, each station may exchange BER information regarding the incoming control channel signal so that each station may adjust the amount of error correction overhead in direct relation to the quality of the channel over which that station must transmit data. The particular overhead scheme selected is transmitted from the appropriate station so that the proper decoding scheme is selected at the receiving station. The selected scheme can be transmitted with one or more bits in each packet or frame, each time a change is made, or on a scheduled, periodic basis.

Figure 6:
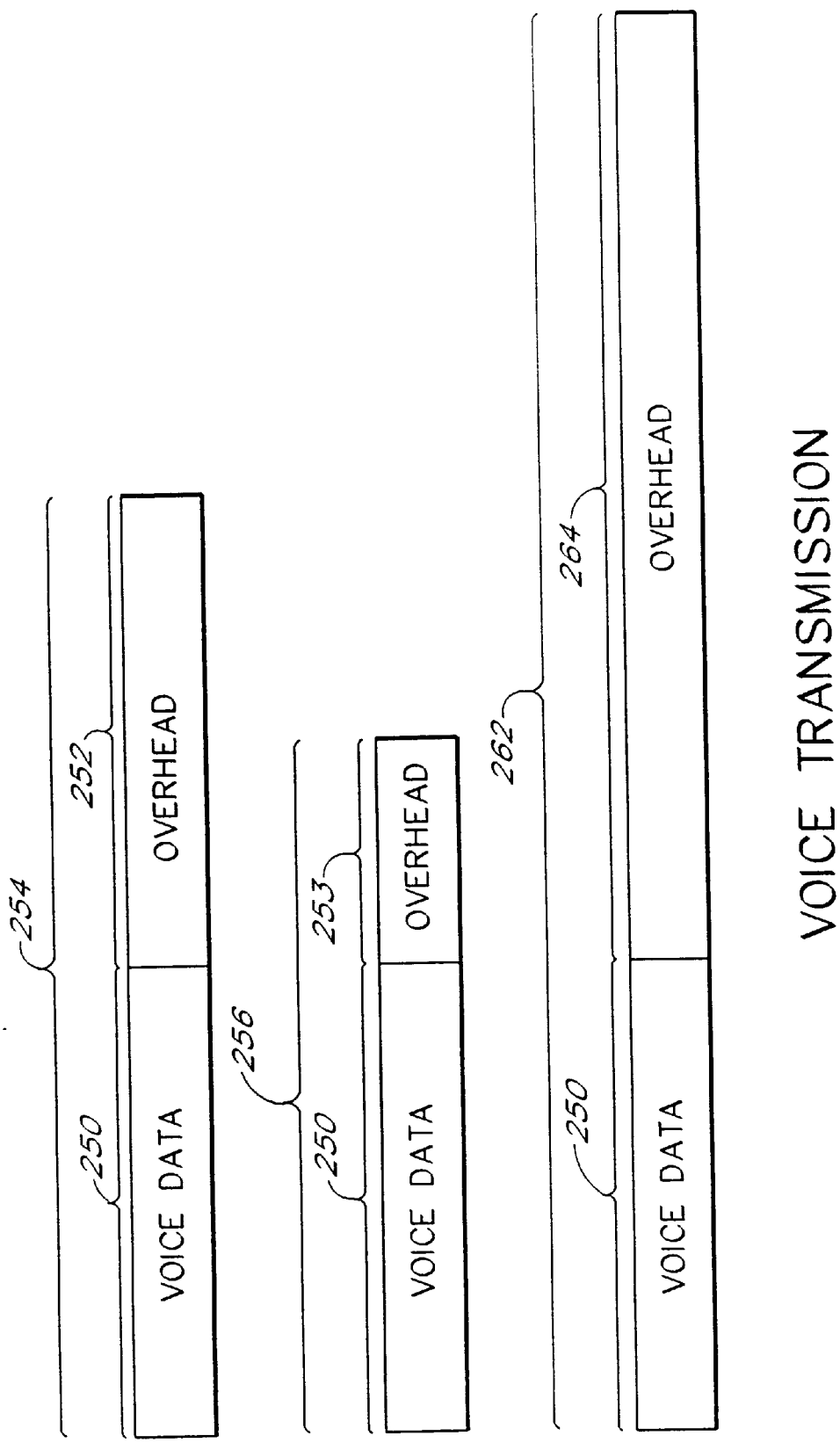
FIG. 6 illustrates varying voice frames resulting from varying the use of overhead in accordance with the present invention.

FIG. 6 provides a visual illustration of the overhead adjustments made to data transmissions over the traffic channel in response to control channel quality. Transmissions over digital wireless systems comprise a plurality of bits. These bits comprise effective data 250 and a certain amount of error correction overhead 252, 253, 264, both of which are combined into a voice frame 254, 256, 262. Of course, as is understood in the art, the overhead is generally not one block of bits. With convolutional encoding and other encoding techniques, the redundancy is encoded such that the actual data bits no longer exist as separate, identifiable bits. Accordingly, FIG. 6 is merely illustrative of changing the level of overhead. In addition, the proportions of the data and overhead are not intended to indicate a precise scale. A transmitter in either of base station 106 or mobile station 102 transmit the frames 254, 256, 262. Since each frame 254, 256, 262 is comprised of a number of bits, the transmitter outputs the data at a certain bit rate. As mentioned previously, for systems of the prior art, the bit rate, or bits transmitted per second, is generally held constant during the duration of the communication link, regardless of channel quality. Holding the bit rate constant undesirably limits the maximum number of mobile stations 102 which a base station 106 may support.

Using the principles of the present invention, however, the transmitting station, the base station 106 and/or mobile station 102, alters the overhead depending on the quality of the control channel. For example, assuming each frame of FIG. 6 is transmitted in the same amount of time, the second frame 256 includes minimal overhead 253, yet maintains the same effective data rate for the effective data 250 (voice or data information). Thus, the total bit rate for the second frame 256 is lower than for the first frame 254. The overhead selector 148 reduces the overhead in response to a low BER as determined by the channel quality estimator 150 (FIG. 2).

Accordingly, the reduced overhead 253 results in a reduced number of bits to send. Reducing the bit rate of a plurality of mobile stations 102 frees bandwidth of the base station 106, thereby allowing the base station to support additional mobile stations.

Conversely, if the channel quality estimator 150 indicates a high BER, the overhead scheme selector 148 increases the overhead. The third frame 262 illustrates an increase in the amount of overhead 264 to provide additional error correction capability in response to the high BER value. As shown however, the system maintains the effective bit rate of the voice data 250 to ensure a high quality signal. But, the overhead 264 increases as does the total bit rate of the outgoing frame 262, which in turn consumes a greater percentage of a base station's bit rate allocation. The increased error correction overhead 264 desirably ensures voice clarity and reduces incidence of dropped calls.

Figure 7:
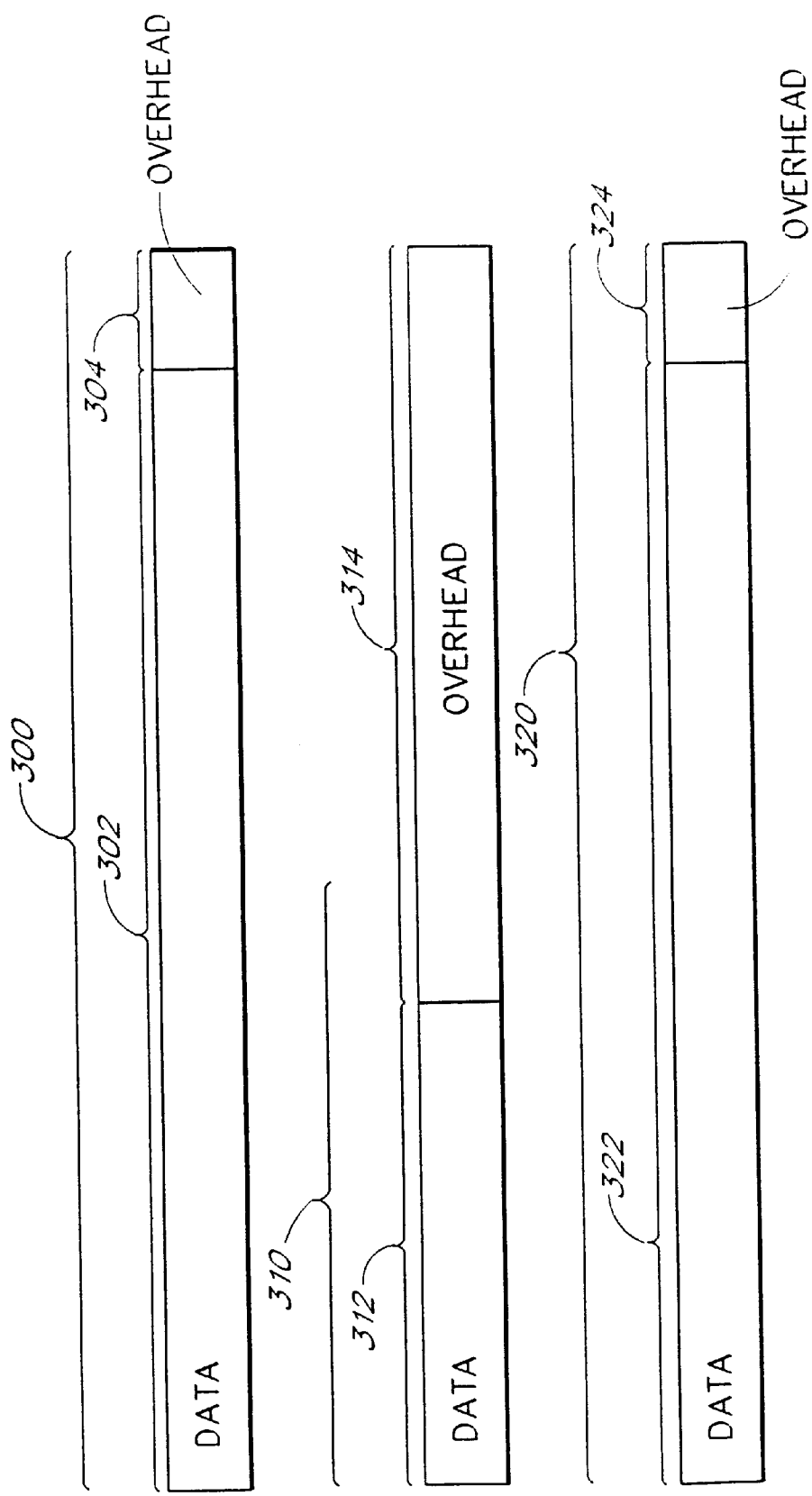
FIG. 7 illustrates varying data packets based upon channel quality estimation in accordance with the present invention.

FIG. 7 provides a similar illustration of the advantages of the present invention when utilized in conjunction with digital data transmission for both voice or digital data other than voice. Digital wireless communication systems generally maintain a constant sampling rate of the analog voice signals causing the rate of digital data generated for voice communication to be generally constant. FIG. 6 illustrates the generally constant size of the voice data information 250. However, in another embodiment, for instance when wireless communication systems transmits non-voice digital data or voice data, the effective data rate need not be held constant, and hence the rate of data transmission may increase in response to ideal channel conditions. Examples of digital data transmission shown in FIG. 7 comprise transmission of e-mail, facsimile, file download, Internet access, or voice transmission with changes to voice encoding. While systems of the prior art undesirably hold the data transmission rate or effective bit rate constant during the entire communication link even though the channel may support a higher effective bit rate, systems adopting the principles of the present invention benefit from the channel quality estimator 150 (FIG. 2) to alter the effective bit rate.

As shown in FIG. 7, the first data packet 300 is exemplary of a first data/overhead percentage. As shown, the data 302 comprises the majority of the data packet and the overhead 304 comprises a generally smaller portion of the signal packet 300. If the channel quality is too poor to support the standard bit rate, the overhead may be adjusted.

The second data packet 310 illustrates a situation when the channel quality estimator 150 (FIG. 2) determines a high BER on the control channel. Inferring that the traffic channel is also encountering corruption, the overhead selector 148 reduces the effective data rate and increases overhead thereby sending less data 312. Lowering the effective bit rate maintains the data link and continues data transmission, albeit at a slower rate. Hence, the likelihood of a dropped data link is significantly reduced.

The third data packet 320 illustrates an example of the channel quality estimator 150 (FIG. 2) reporting a low BER, a sign of a robust traffic channel. The communication system takes advantage of the traffic channel's ability to support an elevated effective bit rate and accordingly increases the amount of data 322 (bits for voice or bits or data), while decreasing the amount of overhead 324. Increasing the effective data rate effectively decreases the time required to download a set amount of data or increases the voice quality. In the case of non-voice data, this in turn reduces the time that a communication system must maintain the communication link. Advantageously, this more rapidly frees system resources so that the base station 106 may support other mobile data links.

Figure 8:
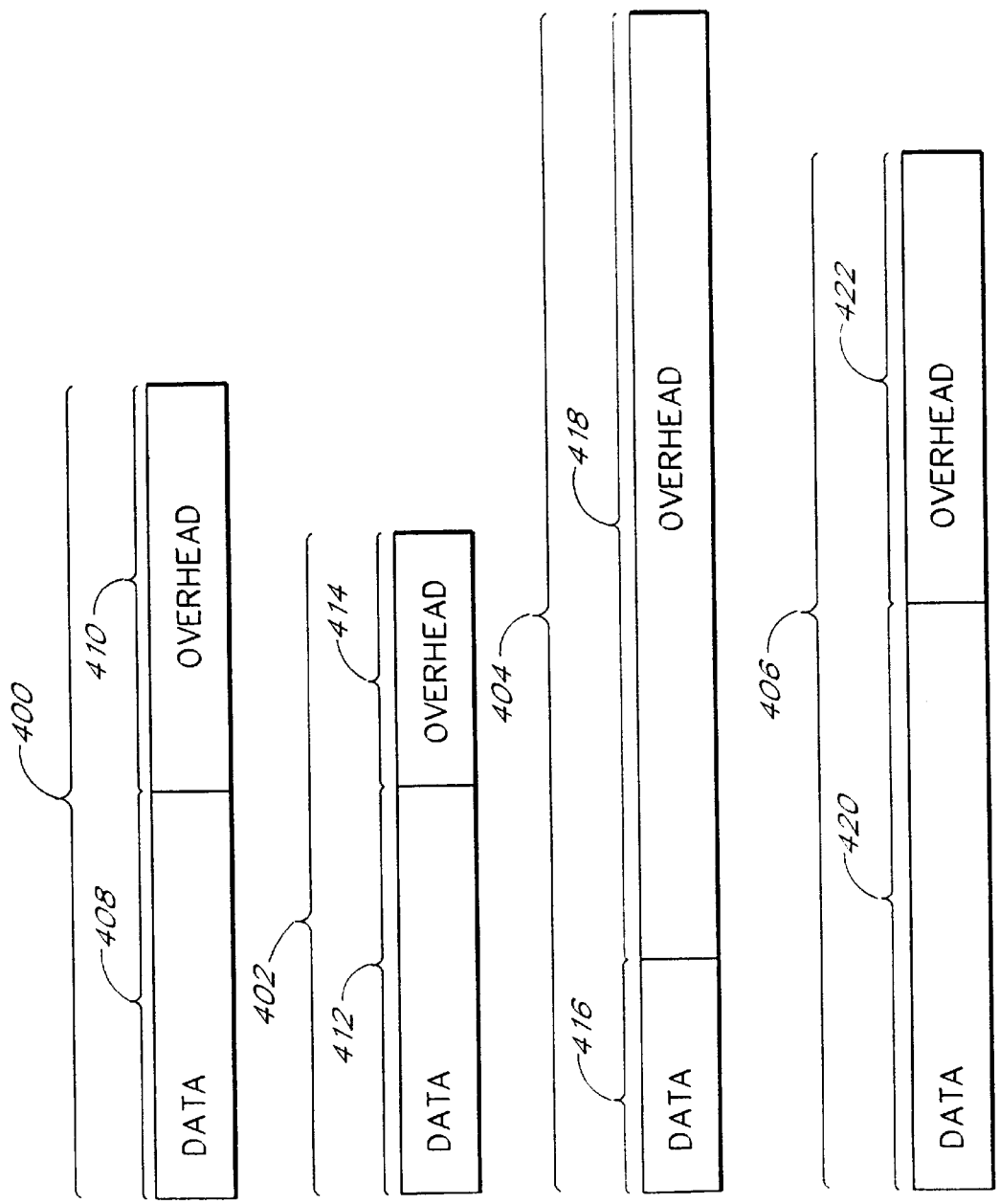
FIG. 8 illustrates varying both the amount of data and the amount of error correction in accordance with one aspect of the present invention.

FIG. 8 illustrates yet another application of the channel quality estimation of the present invention. As depicted in FIG. 8, the number of data bits, the amount of overhead, and the overall size of the packet or frame may be adjusted. As depicted in Figure, a frames or packets 400, 402, 404, 406 differ in the number of data bits 408, 412, 416, 420, overhead 410, 414, 418, 422 and in the overall length of the packet or frame. In accordance with the present invention, channel quality estimation is used to provide flexibility in all of these parameters, as depicted in FIG. 8.

Of course, the principles of the present invention to adjust overhead in response to channel quality could also be utilized by monitoring the traffic channel itself rather than the control channel. However, due to the many fluctuations and the inherent unreliability of the traffic channel to determine signal quality, the control channel is the more desirable embodiment. To use the control channel, the requirement is that the control channel signal quality is representative of the traffic channel quality. This is the case where the channels are related, as is usually the case. Such relation between the channels may be frequency, frequency band, or simply experiencing similar interference or fading.

Methods and apparatus for evaluating the quality of the control channel other than those described herein may be employed without departing from the teachings of the invention disclosed herein. Likewise, those of ordinary skill in the art may develop other benefits from using the control channel to evaluate quality of the traffic channel.

For example, in one alternatively embodiment the present invention may monitor the channel condition on a paging channel or broadcast channel, both of which are control channels. The estimated BER from these channels can determine the bit rate during call setup, thus maximizing the effective data throughput or speech quality at the beginning of a call or transmission.

It is contemplated that the apparatus evaluating the control channel be embodied in hardware and/or software and integrated into both of a mobile station 102 and/or base station 106.

What is claimed is:

1. A method for modifying the encoding scheme for at least one connection in a GSM communication system having at least one control channel and at least one traffic channel, wherein the traffic channel and the control channel are separate channels, said method comprising the steps of:

monitoring the signal quality of said at least one control channel;

assigning a comparable signal quality to said at least one traffic channel; and selecting an encoding scheme to apply to said traffic channel based upon the comparable signal quality, wherein the selected encoding scheme increases an error correction capability when the comparable signal quality is below a predetermined parameter, and wherein the selected encoding scheme decreases the error correction capability when the comparable signal quality is above the predetermined parameter.

2. The method of claim 1, wherein said control channel signal is an encoded signal, said step of monitoring comprises the steps of:

receiving a control channel signal over said at least one control channel;

decoding said control channel signal;

reencoding the control channel signal; and comparing the received control channel signal with the re-encoded control channel signal to determine the difference between the received and reencoded signal, said difference representing errors in said control channel signal.

3. The method of claim 1, wherein said control channel signal is an encoded signal, said step of monitoring comprises the steps of:

receiving a control channel signal over said at least one control channel;

decoding said control channel signal, and if a PASS results, reencoding the control channel signal; and comparing the received control channel signal with the re-encoded control channel signal to determine the difference between the received and reencoded signal, said difference representing errors in said control channel signal.

4. The method of claim 2, wherein receiving a control channel signal comprises using an antenna to receive a signal via radio waves.

5. The method of claim 2, wherein said step of decoding comprises applying a decoding algorithm to said signal to obtain a signal representative of the signal prior to initial encoding.

6. The method of claim 2, further comprising filtering said difference.

7. The method of claim 2, wherein the difference is used to generate a bit error rate.

8. The method of claim 3, wherein the difference is used to generate a bit error rate.

9. The method of claim 2, wherein the traffic channel carries digitized voice signals.

10. The method of claim 2, wherein said at least one control channel comprises a slow associated control channel in a GSM system.

11. The method of claim 2, further comprising permitting additional mobile stations to communicate with a base station during periods of high channel quality.

12. The method of claim 2, wherein selecting the encoding scheme comprises selecting the amount of error correction overhead.

13. The method of claim 1, wherein said step of selecting comprises selecting an encoding scheme and a data rate.

14. The method of claim 1, wherein said step of monitoring comprises the steps of:

receiving a control channel signal over said at least one control channel;

decoding said control channel signal;

reencoding the control channel signal; and determining a frame error rate for said control channel.

15. The method of claim 3, wherein said step of monitoring comprises the steps of:

receiving a control channel signal over said at least one control channel;

decoding said control channel signal;

reencoding the control channel signal; and determining a frame error rate for said control channel.

16. An error correction controller selector which selects the amount of error correction overhead to apply to a traffic channel signal in a mobile communication system having at least one control channel and at least one traffic channel, said controller comprising:

a control channel signal quality estimator; and a traffic channel encoding selector coupled to said control channel signal quality estimator, said encoding selector selecting an appropriate error correction scheme to apply to data transmissions on said at least one traffic channel in response to said control channel signal quality estimator, wherein the traffic channel and the control channel are separate channels.

17. The error correction controller of claim 16, wherein said control channel signal quality estimator comprises a control channel signal storage module, a control channel re-encoding module, a comparator coupled to said control channel signal storage module and said re-encoding module, and an error evaluator.

18. A station in a wireless communication system comprising:

an antenna;

a receiver coupled to said antenna and configured to receive a signal from the antenna and to demodulate said signal;

a control channel quality estimator which evaluates a signal arriving on a control channel; and an error correction selector coupled to said control channel quality estimator and responsive to said control channel quality estimator to select error correction encoding of data transmitted on a traffic channel, wherein the traffic channel and the control channel are separate channels.

19. The mobile station of claim 18, wherein said station comprises a cellular telephone.

20. The base station of claim 18, wherein said station comprises a cellular site.

21. An error correction controller selector which selects an amount of error correction overhead to apply to a traffic channel signal in a mobile communication system having at least one control channel and at least one traffic channel, said controller comprising:

a control, channel signal quality estimator; and a traffic channel encoding selector coupled to said control channel signal quality estimator, said encoding selector selecting an appropriate error correction overhead scheme to apply to data transmissions on said at least one traffic channel in response to said control channel signal quality estimator, wherein different error correction overhead schemes differ in an amount of error correction bits transmitted on said at least one traffic channel, and wherein the traffic channel and the control channel are separate channels.

* * * * *